(12) United States Patent
Baldwin (10) Patent No.: US 10,073,541 B1
(45) Date of Patent: Sep. 11, 2018

(54) INDICATORS FOR SENSOR OCCLUSION

(75) Inventor: Leo B. Baldwin, San Jose, CA (US)

(73) Assignee: Amazon Technologies, Inc., Reno, NV (US)

(*) Notice: Subject to any disclaimer, the term of this patent is extended or adjusted under 35 U.S.C. 154(b) by 662 days.

(21) Appl. No.: 13/531,285

(22) Filed: Jun. 22, 2012

(51) Int. Cl.
G06F 3/01 (2006.01)
G06F 3/0346 (2013.01)

(52) U.S. Cl.
CPC ............ *G06F 3/0346* (2013.01); *G06F 3/017* (2013.01)

(58) Field of Classification Search
CPC ...... G06F 3/0346; G06F 3/0338; G06F 3/038; G06F 3/0488; G06F 3/017
USPC ................................ 345/156–173; 178/18.01
See application file for complete search history.

(56) References Cited

U.S. PATENT DOCUMENTS

| | | | | |
|---|---|---|---|---|
| 8,515,128 | B1* | 8/2013 | Hildreth | ........................ 382/103 |
| 8,531,410 | B2* | 9/2013 | Roth | ..................... G06F 3/0488 |
| | | | | 345/156 |
| 2010/0182450 | A1* | 7/2010 | Kumar | ............... H04N 1/00002 |
| | | | | 348/229.1 |
| 2011/0242286 | A1* | 10/2011 | Pace | ................... H04N 13/0025 |
| | | | | 348/47 |
| 2012/0229380 | A1* | 9/2012 | Silvester | ............... G06F 1/1626 |
| | | | | 345/158 |
| 2013/0082978 | A1* | 4/2013 | Horvitz | .................... G06F 3/017 |
| | | | | 345/175 |
| 2013/0155474 | A1* | 6/2013 | Roach | .................. G06Q 20/322 |
| | | | | 358/505 |

* cited by examiner

*Primary Examiner* — Alexander Eisen
*Assistant Examiner* — Mansour M Said
(74) *Attorney, Agent, or Firm* — Polsinelli LLP (57) ABSTRACT

Applications such as gesture detection and head tracking can utilize one or more imaging elements on a computing device. While it can be desirable to hide these elements as much as possible so as to have minimal impact on the design or appearance of the device, hiding the elements can cause users to inadvertently cover or block these elements when performing certain actions. When one or more of these elements are determined to be blocked or obscured by a user, the device can provide one or more indicators or cues that can indicate not only that the user is blocking an element, but also indicates the location of the element. The cues can take the form of circles, arcs, arrows, or other elements that can guide the user to the location of an element. Other indicators can be used as well, as may include audio and/or haptic feedback.

20 Claims, 6 Drawing Sheets

INDICATORS FOR SENSOR OCCLUSION

BACKGROUND

People are increasingly utilizing computing devices, including portable and mobile devices, to perform various types of tasks. Accordingly, there is a desire to increase the ways in which users interact with the devices to perform these tasks. One interaction approach that is gaining in popularity involves gesture input. To provide gesture input, a user positions himself or herself in front of a camera or sensor and makes a motion with a feature such as the user's hand or arm. A computing device can capture images or sensor data to attempt to recognize the motion. For devices such as portable computing devices, a sleek looking design can be a significant factor in the popularity of the devices. Accordingly, it can be desirable to minimize the visibility of these cameras or sensors to the extent that is practical. Unfortunately, users typically hold these portable devices in their hands, and if the locations of these cameras or sensors are not obvious, users can inadvertently and/or unknowingly obscure the cameras or sensors with their hands or other such objects, which can prevent successful gesture input.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to interact with an electronic device. In particular, various approaches discussed herein enable a user to provide input through motions or gestures using one or more cameras, gesture sensors, gesture cameras, head-tracking cameras, or other such elements of a computing device. For devices, such as portable or mobile devices, where a user might obstruct one or more of the gesture elements while holding or operating the device, one or more notifications can be provided when the obstruction is detected. In some embodiments, the notifications can take the form of graphical indicators that not only indicate to the user that the user is obstructing the view of one or more of these gesture elements, but also can indicate to the user the location of the obstructed gesture element(s) such that the user can make any necessary adjustments in order to remove or adjust the obstruction. Other notifications or cues can be provided as well, such as audio or haptic cues, which can be provided instead of, or in addition to, the graphical cues.

Various other applications, processes, and uses are presented below with respect to the various embodiments.

Figure 1:
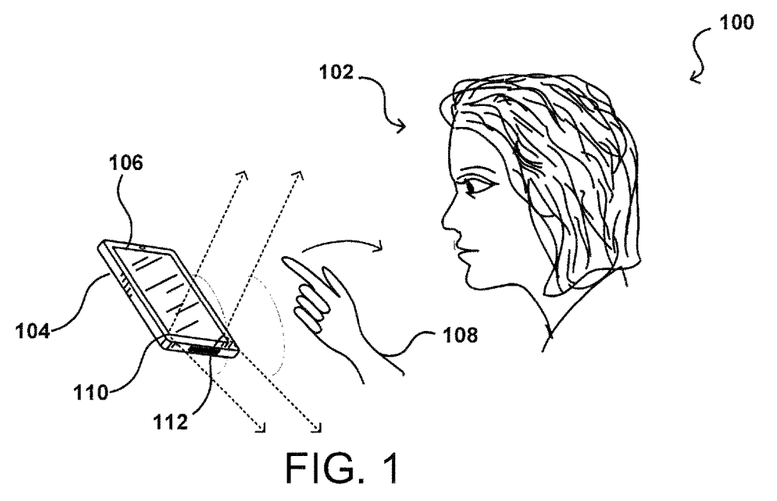
FIG. 1 illustrates an example situation of a user attempting to provide gesture input to a computing device in accordance with one embodiment.

FIG. 1 illustrates an example situation 100 wherein a user 102 is attempting to provide input to a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In various embodiments, a user can provide input by contacting a touch screen 106, which can accept input using approaches such as resistive and capacitive touch technology as known in the art. In various embodiments a user can additionally (or alternatively) provide input using gestures or motions that are detected by the device. For gesture input, a user can make a motion or perform an action with an object or a feature of the user, such as the user's finger or hand 108, which can be captured by one or more cameras, sensors (e.g., low resolution, low power imagers), or other gesture elements 110, 112 of the device, as long as the finger or hand is within a field of view of the gesture elements. The captured image information can be analyzed by the device to determine various information, such as the relative position of a feature, motion of the feature, a shape of the feature, and other such information, in order to provide input to the computing device.

As mentioned, the sleekness, design, or aesthetic appeal of a computing device can be an important selling point, and a way to differentiate from other devices. Accordingly, designers and manufactures can attempt to hide elements such as gesture sensors to the extent possible. For example, consider the closer view 200 of the computing device 104 illustrated in FIG. 2. It should be understood that like reference numbers are carried over between figures for similar elements for simplicity of explanation, but that these reuse of these numbers should not be interpreted as a limitation of the various embodiments described and suggested herein. In this example, a main, high resolution, front-facing camera 202 is illustrated to be obvious to the user, as the user will generally need to know where to look for applications such as video chat, self-portrait capture, and the like. For functions such as gesture input that might use lower resolution and/or lower power sensors, for example, the manufacturer might prefer that the sensors are less obvious, and therefore do not distract significantly from the design of the device. In this example, the gesture sensors 110, 112 are illustrated to be positioned behind a display window or cover glass element 206, which can cover an LCD, OLED, or similar display element, as well as elements positioned outside that display element. By positioning the gesture sensors 110, 112 behind the display window 206, and potentially using small and/or painted aperture components, the gesture sensors might be barely visible to a user of the computing device 104.

Figure 2:
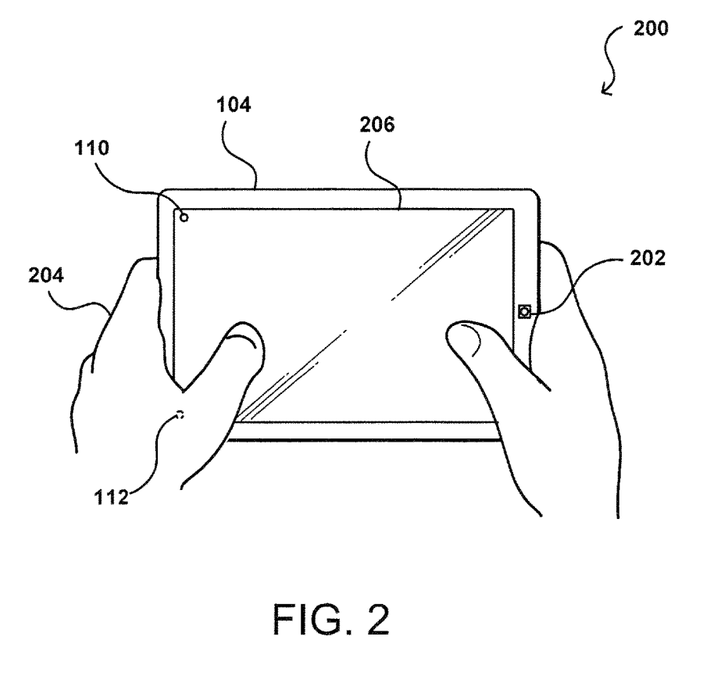
FIG. 2 illustrates an example of a user holding a computing device in such a way that one of the gesture sensors is obscured, which can be addressed in accordance with various embodiments.

As discussed, however, making these gesture sensors as invisible as possible to a user of the device can cause a user to inadvertently cover or obscure the view of those gesture sensors. For example, FIG. 2 illustrates that a user is holding the device using both hands. The user's left hand 204 is obstructing one 112 of the gesture sensors. If the computing device is in a mode where two gesture sensors are needed in order to capture information for three-dimensional gestures, for example, software executing on (or remote from) the device can be prevented from accurately determining the gestures because one of the gesture sensors is obscured, such that three dimensional information may not be able to be determined. Various other situations can occur as well, such as where there is a single gesture sensor that is obscured, or where there are four gesture sensors but at least three of them are at least partially obscured. Other such situations can arise as well in other embodiments.

Approaches in accordance with various embodiments can attempt to notify a user when a number of gesture sensors, cameras, or other such elements are obscured to an extent where an application on the device cannot accurately determine information due at least in part to the obstruction. The notifications can not only provide information that one or more of these elements is being obscured, but can provide the information in such a way that the user can be aware of the locations where the elements are being obscured, such that the user can adjust a position or other such aspect in an appropriate fashion for the current application or task. For example, a device might have multiple cameras and/or sensors of different types and for different purposes, and a user might not otherwise know which cameras are active at the current time. By providing the user with meaningful information about the obstruction, and providing the information in a way that is minimally distracting to the user, the user can know to make the necessary adjustments without significantly degrading the user experience.

Figure 3A:
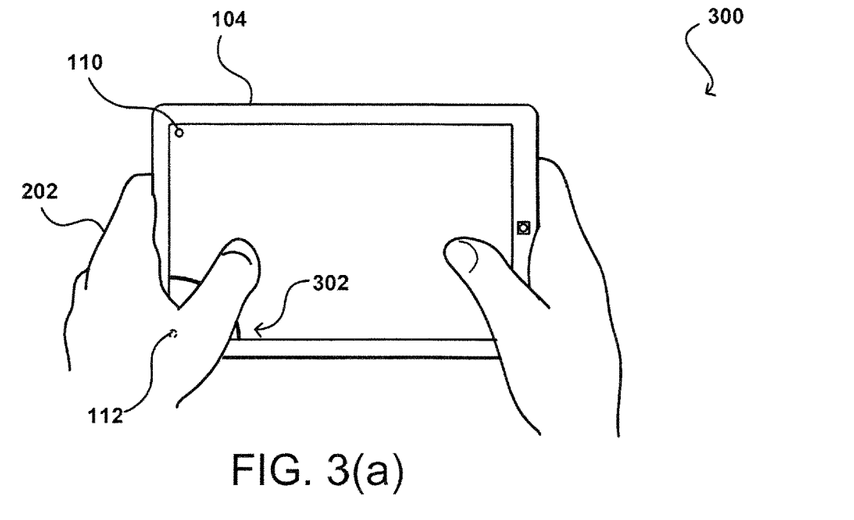
FIGS. 3(a), 3(b), 3(c), and 3(d) illustrate example indications that can be provided when one or more of the cameras or sensors on a computing device is obscured, in accordance with various embodiments.
Figure 3B:
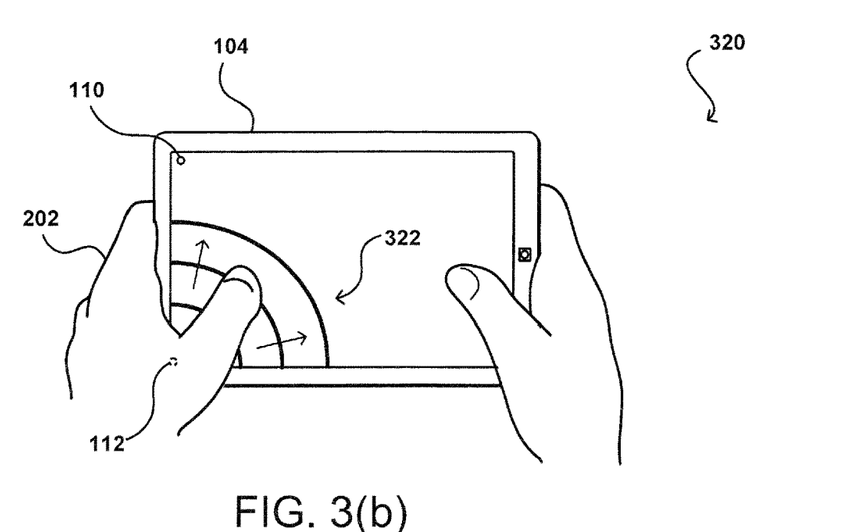

In FIG. 3(a), a view 300 illustrates a user's hand 202 is blocking or obscuring a view of one of the gesture sensors 112. Accordingly, software executing on the device can cause a graphical indicator 302 or other visual cue to be rendered on the display screen of the computing device 104. In this example, the indicator 302 takes the form of a set of concentric circles that appear to emanate from the obscured sensor. Since the obscured sensor 112 is towards an edge of the screen, the circles can appear as expanding arcs—here, arcs 322—on the display screen. As illustrated in the view 320 of FIG. 3(b), the arcs can continue to expand (up to at least a determined radius) and be animated as emanating from the obscured camera until an end event occurs. An end event can be any appropriate event or action causing the notification to no longer be displayed, such as the user removing the obstruction, a maximum amount of time passing, or an ending of a task requiring the gesture information, among other such options.

Figure 3C:
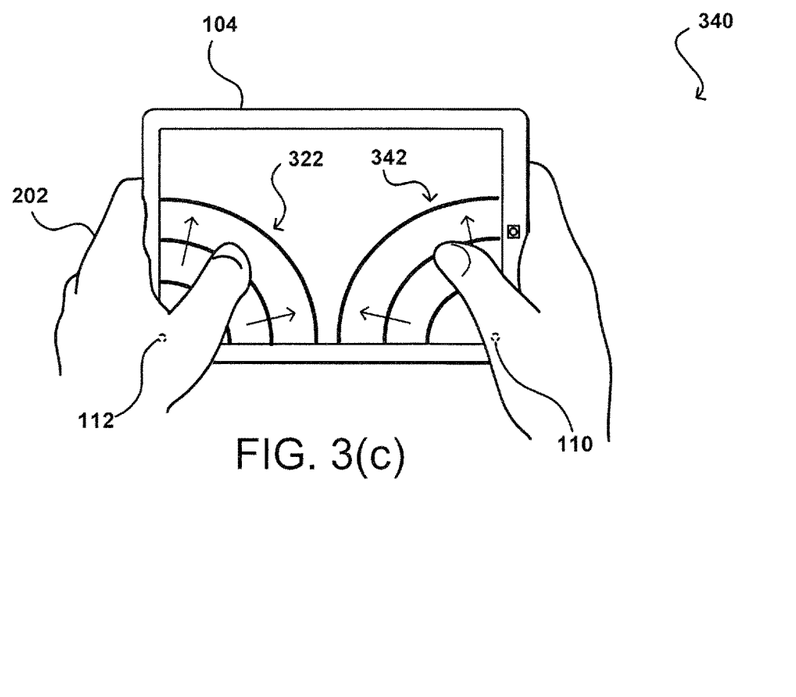

FIG. 3(c) illustrates a view 340 wherein the user is blocking the view of both gesture sensors 110, 112 of the device. As illustrated, software executing on (or remote from) the device 104 can determine that both of the sensors are being obscured, and can provide indicators 322, 342 for both obscured sensors, such that the user can know to move both hands in order to enable the device to capture the information necessary for a current task. Although the indicators or notifications in this example are illustrated to be similar for each sensor, it should be understood that different shapes, colors, sizes, views, or other graphical aspects can be used for different sensors, types of sensors, tasks, etc.

Other types of indicators can be provided as well within the scope of the various embodiments. For example, in FIG. 3(d), which illustrates a view 360, the indicators 368 are still rendered arcs, but the arcs in this example flash instead of moving in an animation. Further, other types of notifications can be provided as well. For example, the primary indicators 368 might be displayed for longer than a threshold amount of time without the user making an adjustment. It is possible the user is not paying attention, does not know what to do, etc. In such an instance, the device might provide an additional notification, or secondary cue. If the user has not received a type of notification before, and thus might not know what the graphical indicators mean, the device might display a secondary cue to guide the user. In other embodiments, a user might configure or set a preference for a certain type of notification, among other such options.

Figure 3D:
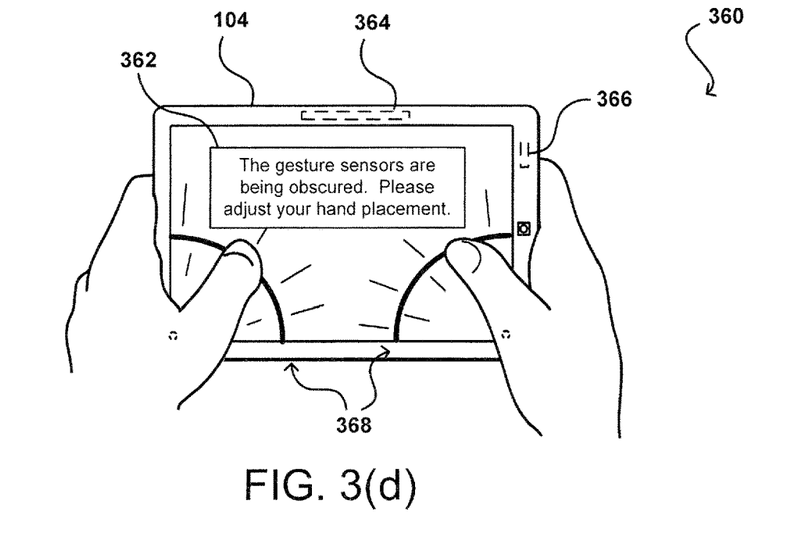

In this example, a secondary cue can take the form of a message 362, generated by the device through audio and/or video presentation, which informs the user of the need to move the user's hands. In some embodiments, the device might use information available from the other cameras, a touch screen, or other such elements to determine what is blocking the sensor view, in order to provide a more accurate message. The message can also change based on whether the user has seen such a notification before, what the user needs to do to remove the obstruction, or other such information.

Other types of indicators can be provided as well. For example, the device can include a haptic feedback element 364 that can cause the device to vibrate or "buzz" if the user is blocking the view of at least one camera or sensor needed for a current task. In some embodiments, the device might first display a graphical notification and then, if the user does not make an adjustment for a period of time (e.g., at least a few seconds), the device might activate the haptic element 364 in order to get the user's attention. A similar action can be performed with a speaker 366 or other audio element configured to emit a noise or generate a sound when the user is blocking a camera or sensor, or has not moved after a period of notification, etc.

Figure 4:
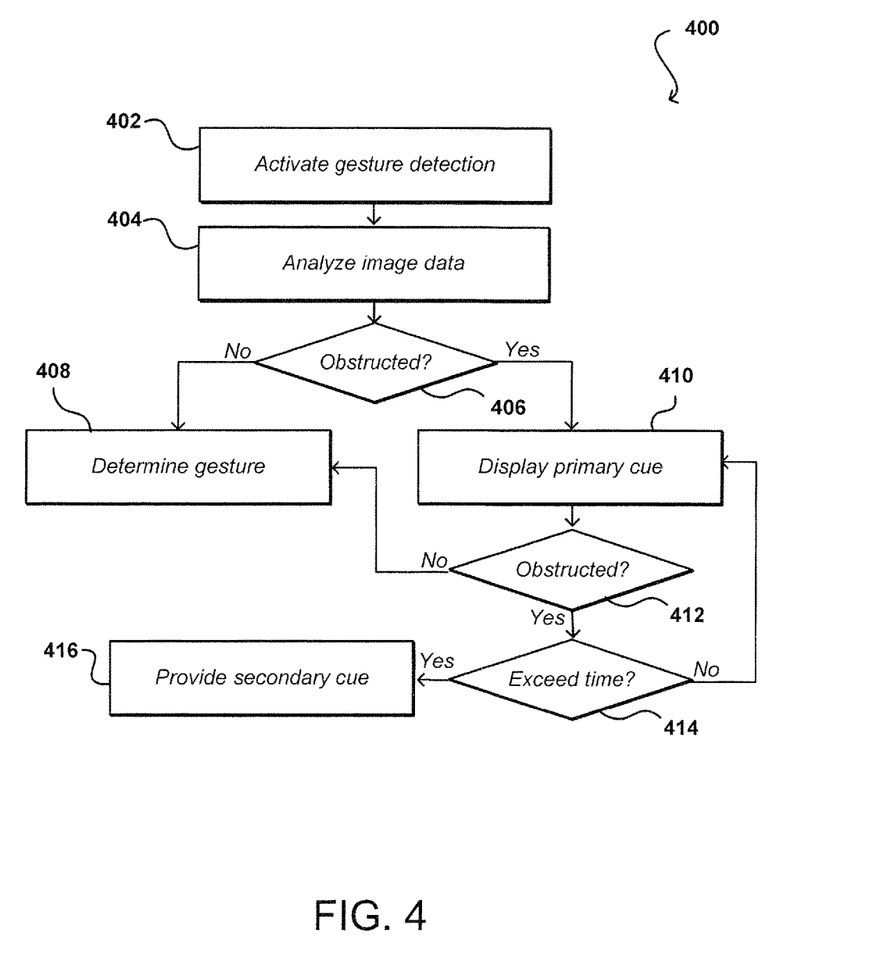
FIG. 4 illustrates an example process for displaying cues when a camera or sensor is obscured that can be used in accordance with various embodiments.

FIG. 4 illustrates an example process 400 for indicating that at least one gesture element is being at least partially blocked, which can be used in accordance with various embodiments. It should be understood that, for any process discussed herein, there can be additional, fewer, or alternative steps performed in similar or alternative orders, or in parallel, within the scope of the various embodiments unless otherwise stated. In this example, gesture detection is activated 402 on a computing device. The activation can be performed manually by the user or automatically in response to the user accessing a certain application, activating a mode of the phone, or another such event or action. As part of the gesture detection, a gesture element such as a camera or gesture sensor (e.g., at least one low resolution imaging element) can capture image data, and the image data can be analyzed 404 to attempt to locate one or more objects that might be performing a gesture that is to be interpreted as input by the computing device. A determination can be made as to whether more than an allowable number of gesture elements for a current task are obstructed 406. For example, a three-dimensional gesture detection algorithm might need two unblocked gesture sensors, and a determination might be made as to whether at least two are able to capture information that does not appear to be blocked by an object such as a finger or hand, among other such objects. If a sufficient number of gesture elements are not obstructed, the device can attempt to determine 408 whether a recognized gesture is being performed.

If more than an allowable number of gesture elements are determined to be obstructed, at least one primary cue can be displayed 410 by the computing device. As mentioned, a primary cue can take the form of rings, arrows, arcs, text, or other graphical elements that can be displayed to indicate that a user is blocking a camera or sensor, as well as to provide an indication to the blocked camera or sensor. Also as discussed, the primary cue can be animated, can flash or change color, or perform another such action to draw the user's attention. If, after the primary cue is displayed, the camera or sensor is determined to no longer be obstructed 412, the primary cue is no longer displayed and the data captured by the camera or sensor can be analyzed to attempt to determine whether a gesture is being performed. If an obstruction is still in place, and a threshold amount of time has been exceeded 414, at least one secondary cue or indicator can be provided 416. As discussed, this can involve displaying a message, causing a haptic element to vibrate, causing an audible tone or sound to be generated, or another such action to be taken. This secondary cue might be repeated for a period of time or number of instances, after which another action might be taken or the device might determine to no longer provide indications in order to conserve resources since the user is not paying attention to the cues. Various other approaches can be used as well within the scope of the various embodiments.

In some embodiments, a gesture element such as a camera or sensor can determine that it is being blocked or obscured when less than a threshold amount of light is being captured with respect to other, similar elements on the device, or when a level of blur or number of viewed features is distinctly different than observed by other elements on the device. If a light sensor detects an amount of light but the gesture sensors do not, the device might determine that the sensors are being obscured. If a sensor obtains a view that has very few features and matches the color range of human skin, the device might determine that the sensor is being obscured. In some embodiments, the device might emit IR radiation and detect the reflected radiation, as objects nearby will appear very bright in the captured image. Such an approach can be used to determine if something is very close to a sensor and, thus, likely blocking the desired view. Further, human skin can appear to "glow" when reflecting IR, such that the device can determine when a human hand or finger is blocking a sensor. Various other approaches can be used as well within the scope of the various embodiments.

The indicators can use various colors or effects to improve their effectiveness. As discussed, the indicators can radiate, be animated, flash, etc. They can also be rendered using enough size and contrast to attract the user's attention, which can be drastically different on relatively small screens for devices such as smart phones than for larger devices such as large format tablet computers. Further, in some embodiments the device can render indicators with colors that contrast with what is currently being shown on the screen. For example, a flashing red arc might not get the user's attention if the current view is also red, but a green flashing arc might. Similarly, animated arrows can be used to point to where the occlusion is occurring, or to direct the user where to move an object causing the occlusion. Various other approaches can be used as well within the scope of the various embodiments.

Figure 5:
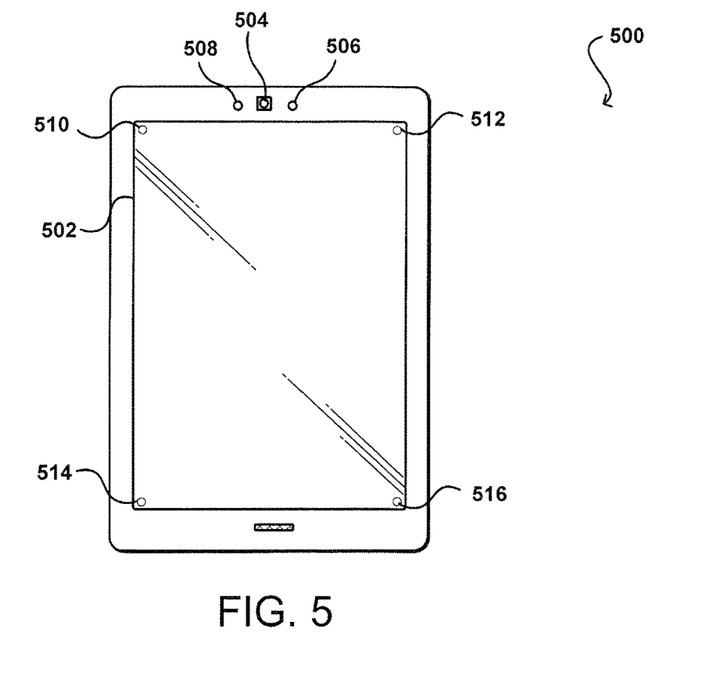
FIG. 5 illustrates an example computing device that can be used in accordance with various embodiments.

FIG. 5 illustrates an example computing device 500 that can be used to perform methods in accordance with various embodiments discussed and suggested herein. In this example, the device has a primary camera 504 positioned on the same side of the device as a display element 502, enabling the device to capture image representing a user of the device during typical operation where the user is at least partially in front of the display element. The device also includes two cameras 510, 512 behind a window of the display element 502 that can be used for purposes such as head tracking, and two gesture sensors 514, 516 (or lower resolution cameras with larger pixels) also positioned behind the window. In this example, each capture element is a camera capable of capturing image data over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 508 is included that can be used to determine an amount of light in a general direction of objects to be captured and at least one illumination element 506, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 6:
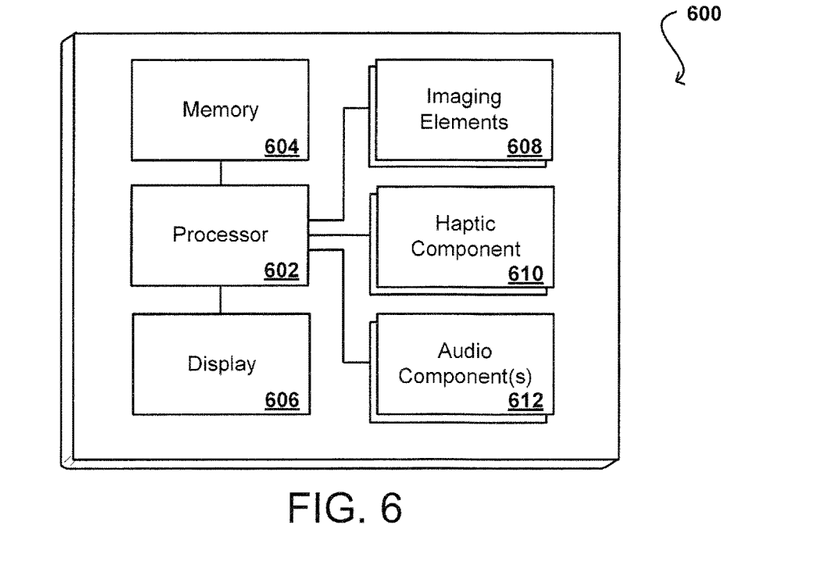
FIG. 6 illustrates an example configuration of components of a computing device such as that illustrated in FIG. 5.

In order to provide various functionality described herein, FIG. 6 illustrates an example set of basic components of a computing device 600, such as the device 500 described with respect to FIG. 5. In this example, the device includes at least one central processor 602 for executing instructions that can be stored in at least one memory device or element 604. As would be apparent to one of ordinary skill in the art, the device can include many types of memory, data storage or non-transitory computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. The touch screen can include, or be associated with, various transmissive elements, LEDs, light sensors, and other components useful in providing BEF or NFOS technology as discussed elsewhere herein.

As discussed, the device in many embodiments will include at least imaging element 608, such as one or more gesture cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one haptic component 610, capable of providing haptic feedback to the user in response to an event, action, instruction, or occurrence. The device also can include at least one audio component 612, such as a speaker for emitting audio and/or computer-generated speech to convey information to a user of the device.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
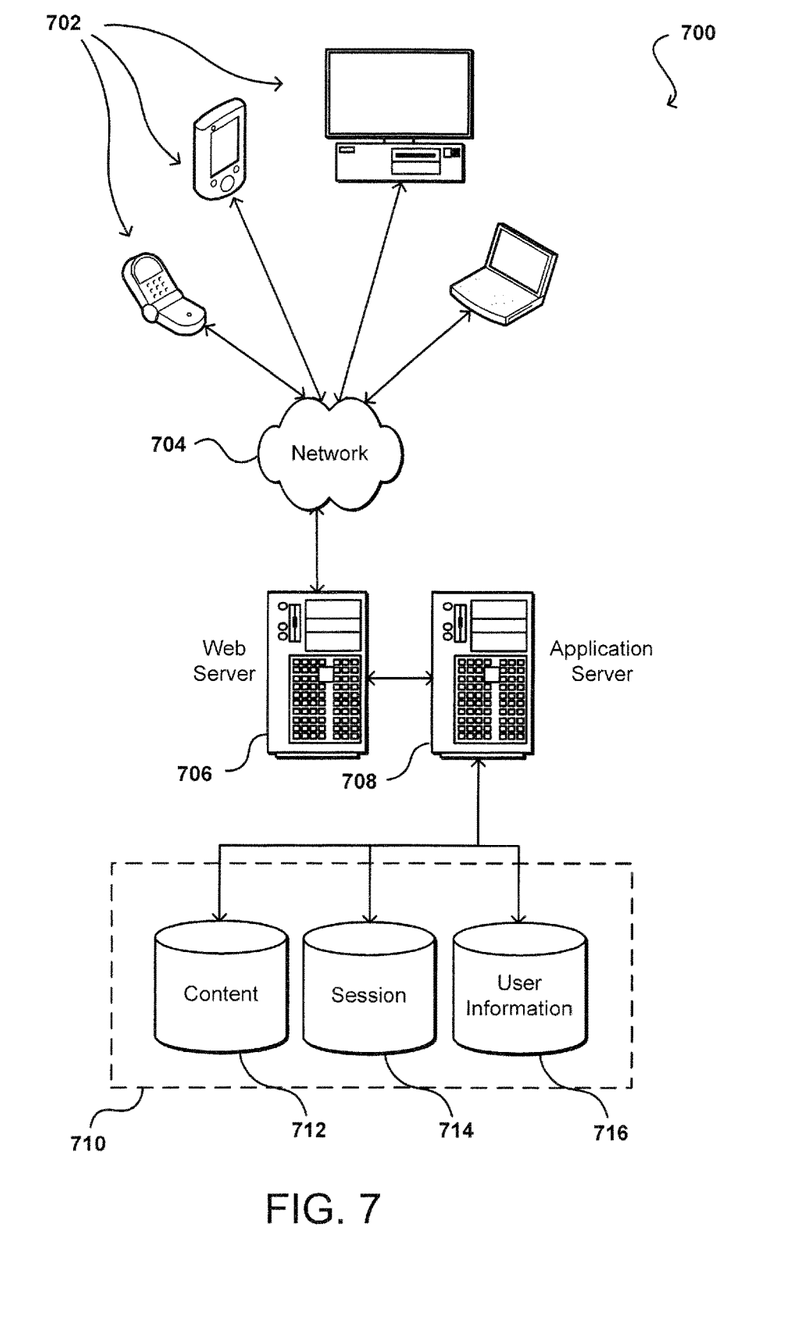
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of detecting gesture input, comprising:
    generating image data using a plurality of gesture cameras of a computing device;
    determining, from the image data, a field of view of a first gesture camera of the plurality of gesture cameras is at least partially obstructed, which prevents the first gesture camera from accurately detecting a gesture input;
    displaying, in response to the field of view of the first gesture camera being at least partially obstructed, a display notification on a portion of a display screen of the computing device that corresponds to a physical location of the first gesture camera to indicate the field of view of the first gesture camera is at least partially obstructed;
    generating additional image data using the plurality of gesture cameras of the computing device;
    determining, from the additional image data, the field of view of the first gesture camera is not obstructed; and
    determine a gesture input for the computing device using, at least in part, the additional image data.

2. The computer-implemented method of claim 1, further comprising:
    providing a secondary indicator when the field of view of the first gesture camera is obstructed for more than a threshold amount of time.

3. The computer-implemented method of claim 2, wherein the secondary indicator includes one of text, a graphical element, a sound, or haptic feedback.

4. A computer-implemented method, comprising:
    generating image data using a camera of a computing device;

determining, from the image data, a field of view of the camera is at least partially obstructed, which prevents the camera from accurately detecting a gesture input; and displaying, in response to the field of view of the camera being at least partially obstructed, a display notification on a portion of a display screen of the computing device that corresponds to a physical location of the camera of the computing device to indicate the field of view of the camera is at least partially obstructed.

5. The computer-implemented method of claim 4, wherein the display notification includes at least one of an arc, a set of concentric rings, or an arrow indicating the location of the camera.

6. The computer-implemented method of claim 4, further comprising:
determining, from additional image data, the field of view of the camera is no longer at least partially obstructed;
stopping display of the display notification; and
analyzing the additional image data to determine a gesture input provided to the computing device.

7. The computer-implemented method of claim 4, wherein the computing device has multiple cameras, the method further comprising:
displaying the display notification when a field of view of more than an allowable number of the cameras is obstructed.

8. The computer-implemented method of claim 4, further comprising:
displaying the display notification until an end event is reached, the end event including at least one of the field of view no longer being obstructed, a specified amount of time passing, a remaining amount of battery power dropping below a determined level, or a closing of a task utilizing gesture input.

9. The computer-implemented method of claim 4, wherein determining the field of view of the camera is at least partially obstructed includes one of detecting less than a threshold amount of light, detecting more than an allowable amount of blur, detecting less than a threshold number of features, detecting less than a threshold amount of color variation, or detecting more than a threshold amount of reflected infrared radiation.

10. The computer-implemented method of claim 4, further comprising:
providing a secondary indicator when the field of view of the camera is at least partially obstructed for more than a threshold amount of time, wherein the secondary indicator includes at least one of a text, a graphical element, a sound, or a haptic feedback.

11. A computing device, comprising:
at least one device processor;
at least one display screen;
at least one camera; and
at least one memory device including instructions operable to be executed by the at least one processor to perform a set of actions, enabling the computing device to:
generate image data using at least one camera;
determine, from the image data, a field of view of at least one camera is at least partially obstructed, which prevents at least one camera from accurately detecting a gesture input; and
display, in response to the field of view of the at least one camera being at least partially obstructed, a display notification on a portion of at least one display screen that corresponds to a physical location of at least one camera to indicate the field of view of at least one camera is at least partially obstructed.

12. The computing device of claim 11, wherein the display notification includes at least one of an arc, a set of concentric rings, or an arrow indicating a location of at least one camera, and wherein the display notification is at least one of animated, flashing, or changing in appearance over time.

13. The computing device of claim 11, wherein the instructions, when executed, further cause the computing device to:
determine, from additional image data, the field of view of at least one camera is no longer at least partially obstructed;
stop display of the display notification on at least one display screen; and
analyze the additional image data to determine a gesture input provided to the computing device.

14. The computing device of claim 11, wherein the computing device has multiple cameras, and wherein the display notification is displayed when a field of view of more than an allowable number of the cameras is obstructed.

15. A non-transitory computer-readable storage medium storing instructions that, when executed by at least one processor of a computing device, cause the computing device to:
generate image data using a sensor of the computing device;
determine, from the image data, a field of view of the sensor is at least partially obstructed, which prevents the sensor from accurately detecting a gesture input; and
display, in response to the field of view of the sensor being at least partially obstructed, a display notification on a portion of a display screen of the computing device that corresponds to a physical location of the sensor in the computing device to indicate the field of view of the sensor is at least partially obstructed.

16. The non-transitory computer-readable storage medium of claim 15, wherein the instructions when executed further cause the computing device to:
provide a secondary indicator when the field of view of the sensor is at least partially obstructed for more than a threshold amount of time.

17. The non-transitory computer-readable storage medium of claim 16, wherein the secondary indicator includes one of text, a graphical element, a sound, or haptic feedback.

18. The non-transitory computer-readable storage medium of claim 15, wherein the display notification includes at least one of an arc, a set of concentric rings, or an arrow indicating the location of the sensor, and wherein the display notification is at least one of animated, flashing, or changing in appearance over time.

19. The non-transitory computer-readable storage medium of claim 15, wherein the instructions, when executed, further cause the computing device to:
determine, from additional image data, the field of view of the sensor is no longer at least partially obstructed;
stop display of the display notification; and
analyze the additional image data to determine an input provided to the computing device.

20. The non-transitory computer-readable storage medium of claim 15, wherein determining the field of view of the sensor is at least partially obstructed includes at least one of detecting less than a threshold amount of light, detecting more than an allowable amount of blur, detecting less than a threshold number of features, detecting less than a threshold amount of color variation, or detecting more than a threshold amount of reflected infrared radiation.

* * * * *